United States Patent
Frame et al.

(10) Patent No.: US 12,454,844 B2
(45) Date of Patent: Oct. 28, 2025

(54) TRAILER SHADING SYSTEM

(71) Applicants: Matthew Frame, Elkview, WV (US);
Kody Frame, Elkview, WV (US)

(72) Inventors: Matthew Frame, Elkview, WV (US);
Kody Frame, Elkview, WV (US)

(*) Notice: Subject to any disclaimer, the term of this patent is extended or adjusted under 35 U.S.C. 154(b) by 221 days.

(21) Appl. No.: 18/496,489

(22) Filed: Oct. 27, 2023

(65) Prior Publication Data
US 2024/0141676 A1    May 2, 2024

Related U.S. Application Data

(60) Provisional application No. 63/381,147, filed on Oct. 27, 2022.

(51) Int. Cl.
*E04H 15/08*    (2006.01)
*B60P 3/34*    (2006.01)
*E04F 10/06*    (2006.01)
*E04H 15/58*    (2006.01)

(52) U.S. Cl.
CPC .............. *E04H 15/08* (2013.01); *B60P 3/343* (2013.01); *E04F 10/0614* (2013.01); *E04H 15/58* (2013.01)

(58) Field of Classification Search
CPC ......... E04H 15/08; E04H 15/58; B60P 3/343; B63B 17/02; A01G 9/22; E04F 10/02; E04F 10/0607; E04F 10/0674; E04F 10/0681; E04F 10/0614
USPC ....... 135/88.1, 88.11, 88.12, 88.07; 296/163, 296/100.03, 107.19, 107.2, 136.11, 143
See application file for complete search history.

(56) References Cited

U.S. PATENT DOCUMENTS

| | | | | |
|---|---|---|---|---|
| 3,292,971 A | * | 12/1966 | Zucker | B60P 3/343 296/100.1 |
| 3,438,670 A | * | 4/1969 | Salmans | E04H 15/06 135/117 |
| 3,707,977 A | * | 1/1973 | Grady | B60P 3/343 135/904 |
| 4,010,973 A | * | 3/1977 | Heinrich | E04H 15/08 135/90 |
| 5,203,393 A | * | 4/1993 | Blevins | E04F 10/0655 160/67 |
| 5,416,965 A | * | 5/1995 | Mayhugh | B60J 7/04 29/DIG. 24 |
| 8,876,189 B1 | * | 11/2014 | Williams | E04H 15/08 296/160 |

(Continued)

*Primary Examiner* — Robert Canfield
(74) *Attorney, Agent, or Firm* — Jaensson Law PLLC; Monika Jaensson, Esq.

(57) ABSTRACT

A retractable shade system coupled with the ceiling of a trailer, and a retractable shade system suitable for coupling with the ceiling of a trailer. The system includes a plurality of longitudinal and latitudinal beams, supporting a plastic sheet to form a shade. A plurality of rollers are provided along the external longitudinal beams. A roof support structure is secured or securable to the ceiling of the trailer, presenting as a pair of c-channel rails to allow retraction and extraction of the shade relative to the roof support structure. A pair of side support posts are affixed to opposing side beams to support the shade in an extracted position, and a handle post having a pin secured at one end is provided to facilitate retracting and extending the shade from the roof support structure, wherein the pin is received within an aperture of one of the external latitudinal beams.

20 Claims, 5 Drawing Sheets

(56) References Cited

U.S. PATENT DOCUMENTS

| | | | | |
|---|---|---|---|---|
| 9,777,483 B2* | 10/2017 | Secco | .................... | H02S 20/30 |
| 10,427,756 B2* | 10/2019 | De Waal | ................. | B63B 17/02 |
| 11,505,108 B2* | 11/2022 | Backer | ................... | E04H 15/06 |
| 11,691,570 B2* | 7/2023 | Perkins | .................. | B60P 3/341 |
| | | | | 224/320 |
| 12,359,438 B2* | 7/2025 | Shan | ....................... | E04H 15/34 |
| 2003/0193209 A1* | 10/2003 | Melvani | .................... | B60J 7/08 |
| | | | | 296/100.03 |
| 2015/0176300 A1* | 6/2015 | Caron | .................... | E04H 15/08 |
| | | | | 135/88.07 |
| 2018/0257745 A1* | 9/2018 | De Waal | ............. | E04F 10/0655 |
| 2022/0097593 A1* | 3/2022 | Backer | ................... | B60P 3/341 |
| 2023/0358070 A1* | 11/2023 | Cheplic | .................. | E04H 15/08 |

\* cited by examiner

FIG. 5
FIG. 6
FIG. 7
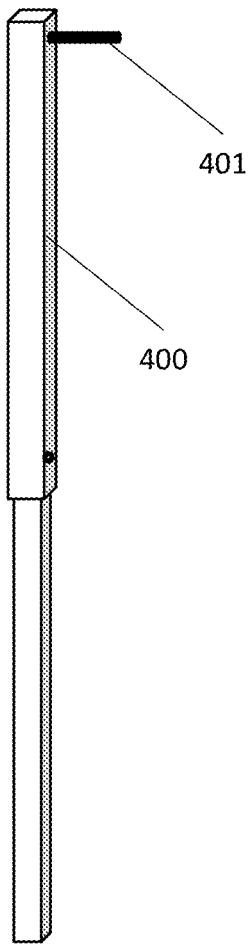
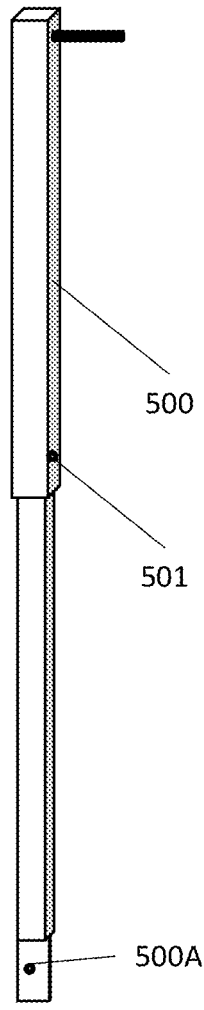
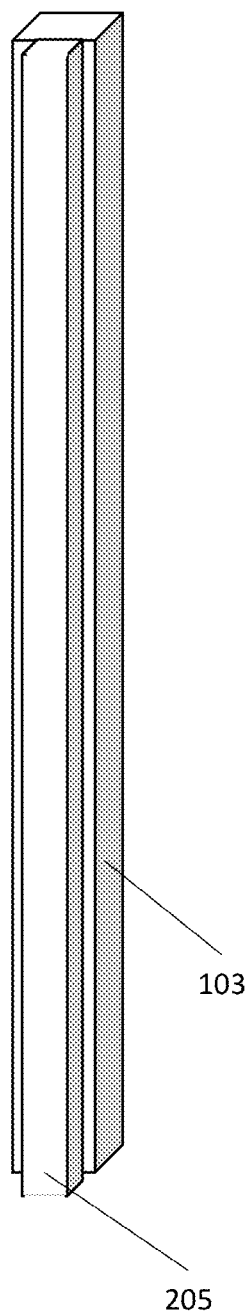

TRAILER SHADING SYSTEM

BACKGROUND

The present invention relates to a novel trailer rooftop shading system for car trailers, utility trailers, horse trailers, or any other pull-behind enclosed trailer, or a box truck.

Trailers, including car trailers, utility trailers, horse trailers, and similar pull-behind trailers, as well as box trucks, provide people with the ability to transport cars, horses, or other sporting equipment, to sporting facilities or locations along the way. Once at the sporting location, hours may be spent in the adjacent parking field or lot while preparing for and awaiting the opportunity to participate in or observe the event.

At times of inclement weather, there are few facilities at outdoor sporting venues to escape rain, snow or other conditions. Further, even in good weather, only popup tents and similar temporary structures are available to shade the participants, supporters and fans from the sun's rays. In moderate to high winds, these popup tents and other temporary structures are often blown down, blown away, or destroyed, further causing a hazard to persons and property.

Therefore, there is a need for a secure shade system which can be easily erected and conveniently stored to protect participants, supporters and fans, equipment and property from inclement weather and the sun's rays.

BRIEF SUMMARY

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

The disclosed technology regards a retractable shade system coupled with the ceiling of a trailer. The system includes a plurality of longitudinal and latitudinal beams, with a pair of external longitudinal beams and a pair of external latitudinal beams to form a frame. Optionally one or more internal longitudinal beams and one or more internal latitudinal beams may be positioned between the external beams; additional beams may also be incorporated into the frame to provide a counterweight thereto on its distal end. A plastic sheet is removably affixed to the frame to form a shade.

The system further includes a roof support structure secured to the roof of the trailer. The roof support structure presents as a pair of c-channel rails secured to the roof of the trailer, wherein the rails are sized to accommodate, secure and allow retraction and extraction of the shade relative to the roof support structure. To facilitate retraction and extraction of the shade relative to the roof support structure, a plurality of rollers are rotatably affixed to and along the external longitudinal beams.

When the shade is extracted from the roof support structure, to support the shade a pair of side support posts are hingedly or removably affixed to each of the external longitudinal beams. Also provided with the system is a handle post having a pin affixed at one end to facilitate retracting and extending of the shade from the roof support structure, the pin being sized to be received within an aperture positioned directly or indirectly on one of the external latitudinal beams.

The disclosed technology further comprises a retractable shade system suitable for coupling with the ceiling of a trailer. The system includes a plurality of longitudinal and latitudinal beams, including a pair of external longitudinal beams and a pair of external latitudinal beams, and optionally one or more internal longitudinal beams and one or more internal latitudinal beams, to form a frame, with a plastic sheet removably affixed to the frame to form a shade.

This system further includes a roof support structure including a pair of c-channel rails secured to the roof of the trailer, the rails being sized to accommodate, secure and allow retraction and extraction of the shade relative to the roof support structure. To facilitate retraction and extraction of the shade relative to the roof support structure, a plurality of rollers are rotatably affixed to and along the external longitudinal beams.

When the shade is extracted from the roof support structure, to support the shade a pair of side support posts are hingedly or removably affixed to each of the external longitudinal beams. Also provided with the system is a handle post having a pin secured at one end to facilitate retracting and extending the shade from the roof support structure, the pin being sized to be received within an aperture positioned directly or indirectly on one of the external latitudinal beams.

The disclosed technology also provides a retractable shade system coupled with a trailer. This system includes a plurality of longitudinal and latitudinal beams, including a pair of external longitudinal beams and a pair of external latitudinal beams, and optionally one or more internal longitudinal beams and latitudinal beams, to form a frame. A polycarbonate plastic sheet is removably affixed to the frame to form a shade.

This retractable shade system further includes a roof support structure including a pair of c-channel rails secured to the roof of the trailer, the rails sized to accommodate, secure and allow retraction and extraction of the shade relative to the roof support structure. To facilitate retraction and extraction of the shade relative to the roof support structure, a plurality of rollers are rotatably affixed to and along the external longitudinal beams.

When the shade is extracted from the roof support structure, to support the shade a pair of side support posts are hingedly or removably affixed to each of the external longitudinal beams. These side support posts may be removably affixed to the external longitudinal beams, presenting with a pin at the proximal end of each side support post for receiving within a corresponding aperture of each of the external longitudinal beams. Two braces presenting as a pair of plates are affixed to opposing sides of a back end of the trailer. The plates have aligned apertures, and are spaced sufficiently apart to receive a distal end of one of the side support posts. When an aperture of the distal end of the side support posts is aligned with the apertures of the plates, a pin may be positioned therethrough to secure the distal end of the side support post to the brace.

Also provided with the system is a handle post having a pin secured at one end to facilitate retracting and extending the shade from the roof support structure, the pin being sized to be received within an aperture positioned directly or indirectly on one of the external latitudinal beams, wherein the aperture positioned on the external latitudinal beam is presented on a tab secured to and extending from the beam.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings.

BRIEF DESCRIPTION OF THE DRAWINGS

FIG. 5 is a peripheral view of an embodiment of a handle post 400 of the disclosed technology;

FIG. 6. is a peripheral view of an embodiment of an internal latitudinal beam of the disclosed technology; and FIG. 7 is a peripheral view of an embodiment of a side support post of the disclosed technology.

DETAILED DESCRIPTION

Figure 1:
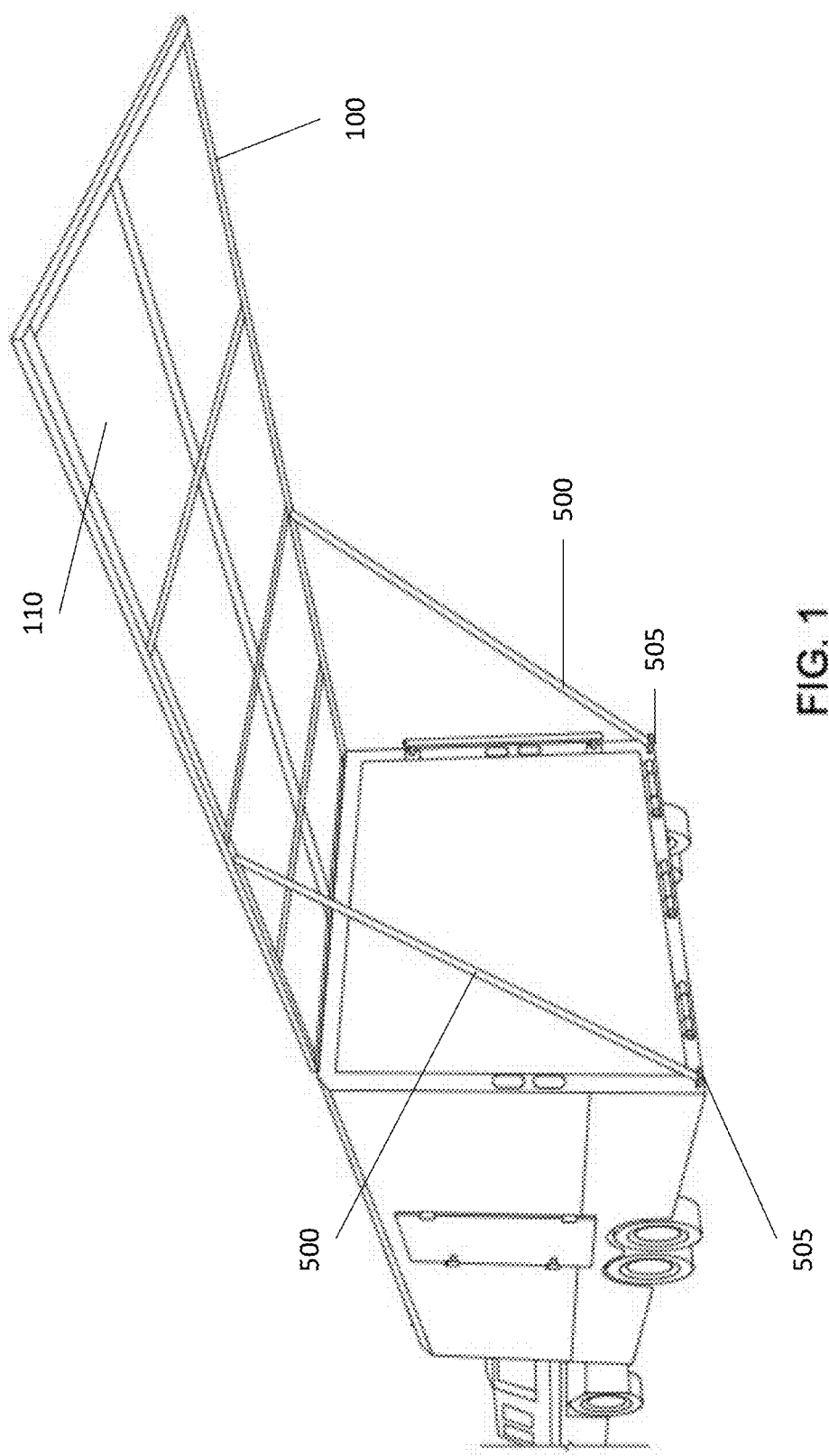
FIG. 1 is a peripheral view of an embodiment of the disclosed technology, shown in its extended position.

The following detailed description and the appended drawings describe and illustrate some embodiments for the purpose of enabling one of ordinary skill in the relevant art to make use of the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

As shown in FIGS. 1-7, the disclosed technology provides a retractable shade system coupled with the ceiling of a trailer. The system includes a shade comprising a plastic sheet 110 removably secured to a frame 100, and as a unit retractably secured to a roof support structure 200. A handle post 400 is provided to extract and retract the shade from the roof support structure, and optionally to support the extracted shade when in use. Side support posts 500 are also provided to support the extracted shade when in use. Optionally, braces 505 may be affixed to opposing sides of the back end of the trailer to support distal ends of the side support posts.

Figure 2:
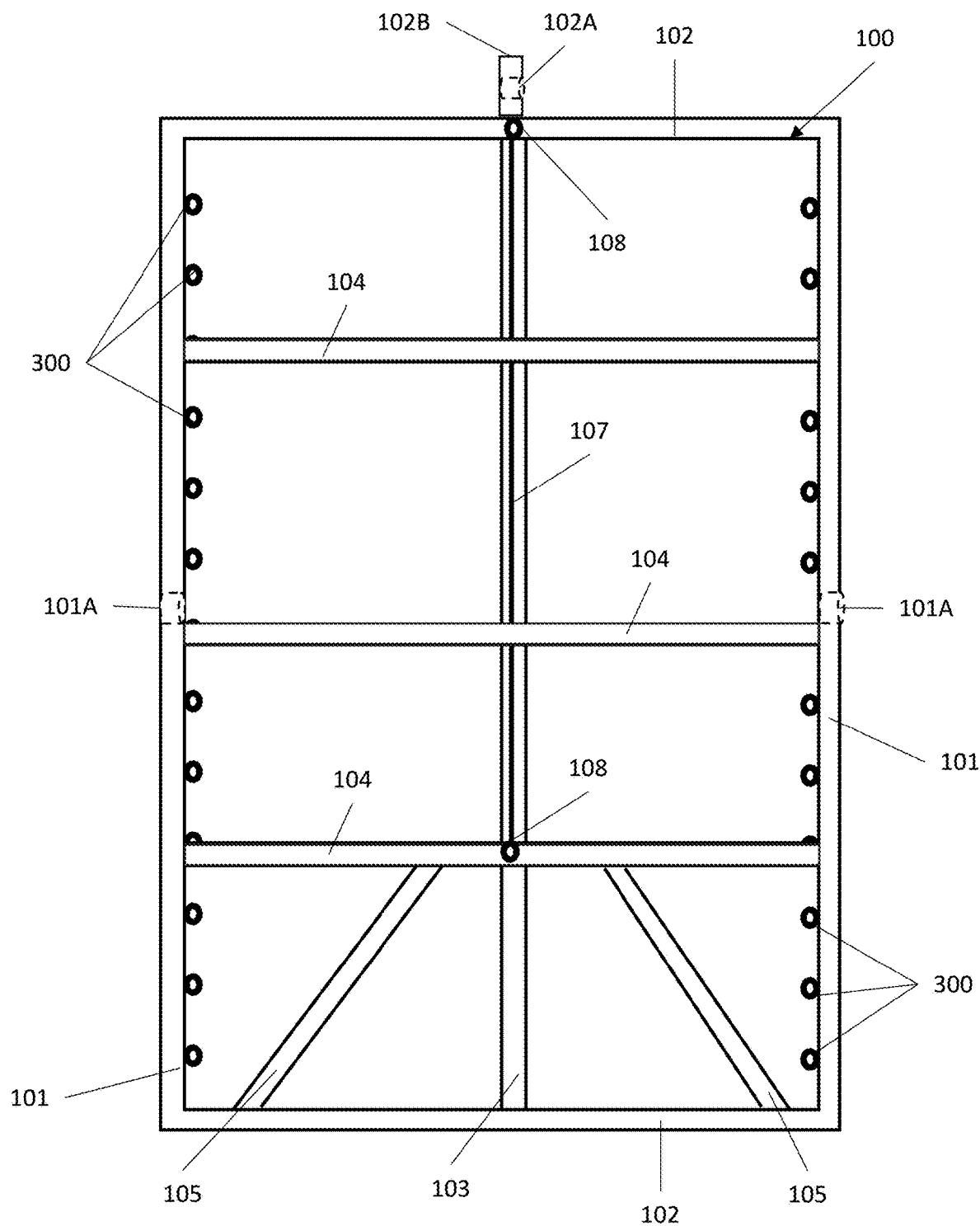
FIG. 2 is a top view of an embodiment of a frame of the disclosed technology.

Turning to FIG. 2, the frame 100 of the retractable shade system of the disclosed technology includes a plurality of longitudinal beams and a plurality of latitudinal beams, including a pair of external longitudinal beams 101 and a pair of external latitudinal beams 102. Further, the frame includes one or more internal longitudinal beams 103 and one or more internal latitudinal beams 104 to support and provide rigidity to the frame. To provide a counterweight to the frame, additional internal beams 105 are provided at the distal end of the frame, affixed to and between one of the internal beams 103, 104, and one of the external beams, 101, 102, preferably at an angle of 30-60 degrees. The ends of the beams 101, 102, 103, 104, 105 may be welded together to form the frame, may be formed as an integral unit, or otherwise affixed one to another to form the frame as described. The centermost internal longitudinal beam may have a larger cross-section than the other beams, to provide strength and rigidity to the frame.

Furthermore, one or more cables 107 (shown in FIG. 3) may be secured to and along at least at least a portion of the length of one or more of the internal longitudinal beams 103. When present, each end of the cable is secured to eyehooks 108 or similar securing means, and by shortening the cable a tension is applied to the frame to prevent it from bowing when in the extended position, as hereinafter described.

Figure 3:
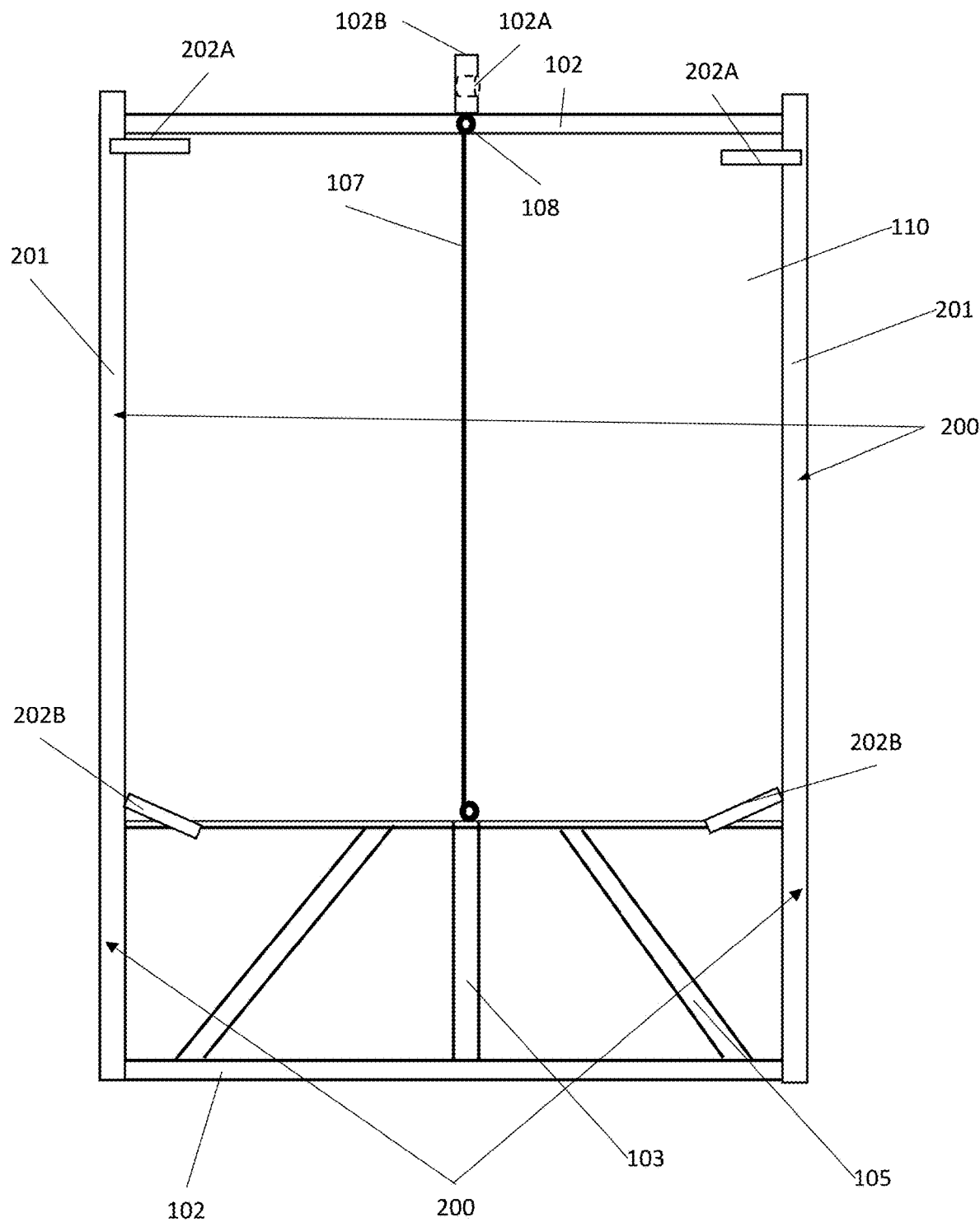
FIG. 3 is a top view of an embodiment of a shade of the disclosed technology, supported within a roof support structure.

As shown in FIG. 3, a plastic sheet 110 is removably secured to at least some of the beams of the frame by means of screws, pop-rivets, or similar affixation means. The plastic sheet may be, for example, 0.030" polycarbonate sheeting. The plastic sheet may extend the length of the frame, or may be absent at the distal end of the frame (as shown).

Further shown in FIG. 3 is a roof support structure 200 of the disclosed technology, including a pair of c-channel rails 201 secured (by bolts or similar affixation means) to an internal or external surface of the trailer ceiling; your inventors recognize that the bottom surface of the c-channel rails may be integrally formed into the roof at the time of manufacture. These rails are sized to accommodate, secure and allow retraction and extraction of the shade from the roof support structure. With trailers that have back doors that extend to the ceiling of the trailer, the roof support structure could be positioned on the interior ceiling of the trailer (instead of the roof).

To facilitate extraction and retraction of the frame 100 relative to the roof support structure 200, a plurality of rollers 300 (see FIG. 2) may be rotatably affixed to and along the external longitudinal beams 101 of the frame. The rollers may be affixed to an internal or external side of the beams, and received within the channel of the roof support structure (with the beams within or outside of the channel). Alternatively, the rollers may be affixed to the bottom surface of the beams, wherein the beams and rollers are received within the channel of the roof support structure. In yet another embodiment, the rollers may be affixed within the beams, wherein a portion of each wheel extends below and through a respective cutout of the beam. In all configurations, the rollers rotate about a post secured on one or both sides to the external longitudinal beam. Alternatively, side mount casters may be affixed to a side of the external longitudinal beams.

To accommodate the slight bow of the trailer roof, the rollers 300 near the distal end of the frame are provided near the top of the sides of the external longitudinal beams, whereas the rollers 300 near the proximal end of the frame are provided near the bottom of the sides of the external longitudinal beams. In this configuration, the distal rollers ride along the internal, top surface of the c-channel rails, while the proximal rollers ride along the internal, bottom surface of the c-channel rails. In a distinct arrangement, rollers may be rotatably secured within and to the c-channel of the roof support structure such that the external longitudinal beams of the frame slide along the rollers when extracted or retracted therefrom.

As shown in FIG. 3, provided at the proximal end of each the c-channel rails is a stop bar 202A, protruding above and to the side of the top surface of the c-channel so as not to interfere with the intended movement of the shade relative to the c-channel; a corresponding stop bar 202B is affixed to one of the latitudinal beams, positioned such that when the shade is fully extended to its intended length, the stop bar 202B secures the shade in place (stops the extraction thereof) by its contact with corresponding stop bar 202A.

To secure the shade to the c-channels when not in use, or during transport, a fastener (such as a spring latch 203, shown in FIG. 4) is secured to the rear of the trailer, positioned to secure within a corresponding aperture of a latitudinal beam, or the tab as hereinafter described. Thereby, when the aperture is aligned with the pin of the spring latch, the same can be inserted therein, thereby securing the shade to the roof support structure; removing the pin allows the shade to be extracted from the roof support structure.

Figure 4:
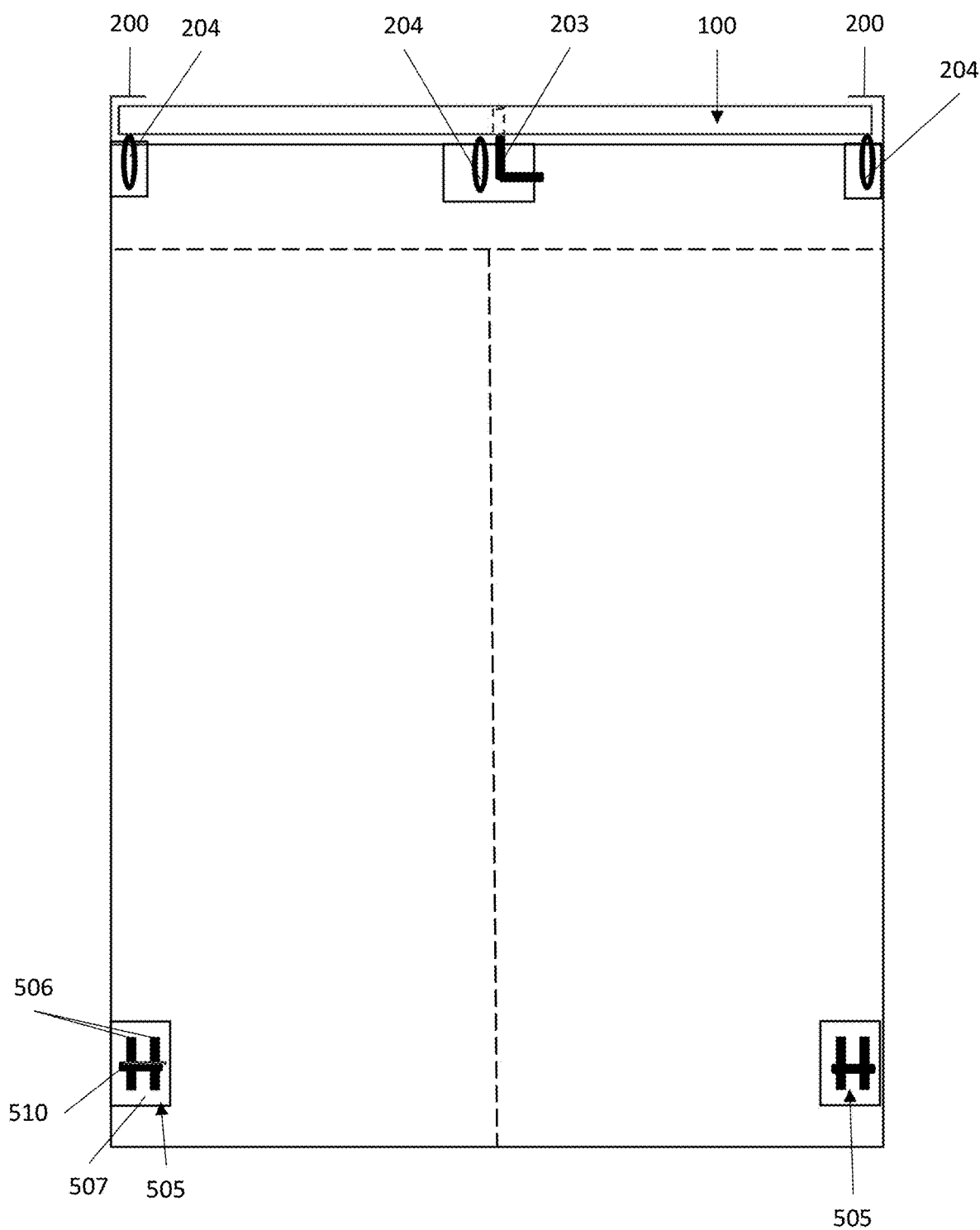
FIG. 4 is a rear view of a trailer with elements of the disclosed technology positioned thereon.

To support the shade as it is extracted from the roof support structure, and to facilitate extraction, one or more wheels 204 may be secured on the back of the trailer, and aligned with the longitudinal beams 101, 103, as shown in FIG. 4. In this configuration, as the shade is extracted from the roof support structure, the beams travel on the wheels 204. In some embodiments the center longitudinal beam 103 has a track 205 positioned along its bottom surface (see FIG. 6) which receives the central wheel 204, and thereby guides and eases the extraction of the shade from the roof support structure.

To extract and retract the shade from and into the roof support structure, an aperture 102A is centrally provided on the distal, external latitudinal beam, to receive the pin 401 of a handle post 400. This aperture may be presented on a tab 102B secured to and extending from the beam, or may be integral with the beam; in some embodiments the aperture is presented on an extension of the internal longitudinal beam 103, extending beyond the external lateral beam 102. In any of these configurations, a user may insert the pin of the handle post (shown in FIG. 5) into the aperture presented for this purpose, and pull the shade from the rooftop support structure. The handle post, with the pin remaining in the aperture, may then be positioned vertically relative to the shade, with the opposing end on the ground, to support the end of the shade when partially or fully extracted.

To provide both purposes of facilitating extraction of the shade and supporting the extracted shade, the handle post may have a length of about the distance between the shade and the ground when the shade is in a fully or partially extracted position; alternatively, the handle post may be presented in telescoping segments, wherein the length thereof may be lengthened for use, or shortened for transport, using a spring button secured on one segment, and one or more apertures along another segment to facilitate adjustment of the length of the handle post. To retract the shade into the roof support structure, the pin of the handle post is inserted back into the aperture 102A, and the shade can be easily pushed back into the rooftop support structure.

As shown in FIGS. 1 and 7, to further support the shade when extracted from the roof support structure, side support posts 500 are removably or hingedly affixed, directly or indirectly, to each of the external longitudinal beams 101 of the frame. In one embodiment, each side support post includes a pin 501 at a proximal end, to be received in an aperture 101A (see FIG. 2) positioned midway along the length of a longitudinal beam. The distal end of the posts may then be positioned on the ground.

Alternatively, and for better support, the distal end of the side support posts may be removably affixed to braces 505 (as shown in FIG. 4) secured to the back side of the trailer. In this configuration, each brace comprises a pair of plates 506, each plate having an aperture aligned with the aperture of the other plate. The plates may be affixed to and extend perpendicularly from a base plate 507, which is secured to the trailer. When intended for use with secured braces, the distal end of each side support post also comprises an aperture 500A, so that when the distal end of the post is received within the plates of the brace, a securing pin 510 may be positioned within the aligned apertures of the brace plates and the side support post to removably secure the same. Suitable pins for this purpose include cotter pins, trailer coupler safety pins, clevis pins, bolts with or without nuts, and other pins or structures to secure the distal end of the side support post within the brace.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

The invention claimed is:

1. A retractable shade system coupled with the roof of a trailer comprising:
   a. a plurality of longitudinal and latitudinal beams, including a pair of external longitudinal beams and a pair of external latitudinal beams, one or more internal longitudinal beams, and one or more internal latitudinal beams to form a frame, with at least two additional beams at the distal end of the frame to present a counterweight to the frame when it is in its extended position;
   b. a plastic sheet removably affixed to the frame to form a shade;
   c. a roof support structure secured to the roof of a trailer, the roof support structure comprising a pair of c-channel rails secured to the roof of the trailer, the rails sized to accommodate, secure and allow retraction and extraction of the shade relative to the roof support structure, and further comprising a plurality of wheels aligned with the external and internal longitudinal beams, and secured to the back of the trailer;
   d. a plurality of rollers rotatably affixed to and along the length of the external longitudinal beams;
   e. a pair of side support posts hingedly or removably affixed to each of the external longitudinal beams; and
   f. a handle post having a pin secured at one end to facilitate retracting and extending the shade from the roof support structure, the pin being sized to be received within an aperture of the frame.

2. The retractable shade system of claim 1, wherein the plastic sheet is made from polycarbonate.

3. The retractable shade system of claim 1, wherein the rollers are affixed to an interior side of the external longitudinal beams, and received with the external longitudinal beams within the rails of the roof support structure.

4. The retractable shade system of claim 3, wherein some of the rollers are affixed to the top of the side of the external longitudinal beams, and other of the rollers are affixed to the bottom of the side of the external longitudinal beams.

5. The retractable shade system of claim 1, wherein the side support posts are removably affixed to the external longitudinal beams, presenting with a pin at the proximal end of each side support post intended to be received within a corresponding aperture of each of the external longitudinal beams.

6. The retractable shade system of claim 5, further comprising braces each presenting as a pair of plates and affixed to a back end of the trailer, the plates having aligned apertures, and spaced sufficiently apart to receive a distal end of one of the side support posts, the distal end of the side support posts also having an aperture therethrough, so that when the apertures of the plates and the distal end of the side support post are aligned, a pin may be positioned therethrough to secure the distal end of the side support post to the brace.

7. The retractable shade system of claim 1, wherein the aperture positioned on the frame is presented on a tab secured to and extending perpendicularly from the external latitudinal beam at the proximal end of the frame.

8. The retractable shade system of claim 1, further comprising a pair of stop bars affixed to one of the latitudinal beams, on opposing sides, and further comprising another pair of stop bars affixed at the proximal end of each of the c-channels, wherein the stop bars of the latitudinal beams and the stop bars of the c-channels are aligned and positioned to stop extraction of the shade from the rails, beyond a pre-defined position.

9. The retractable shade system of claim 1, further comprising a spring latch affixed to the trailer, the spring latch being aligned with an aperture of one of the latitudinal bars of the frame so that when the aperture is aligned with the spring latch, a pin of the spring latch can be inserted into the aperture and secure the frame within the roof support structure for storage.

10. A retractable shade system suitable for coupling with the roof of a trailer, the system comprising:
   a. a plurality of longitudinal and latitudinal beams, including a pair of external longitudinal beams and a pair of external latitudinal beams, and a longitudinal beam and two or more internal latitudinal beams, to form a frame, with a plastic sheet removably affixed to the frame to form a shade;
   b. a roof support structure comprising a pair of c-channel rails secured to an internal or external surface of the roof of the trailer, the rails sized to accommodate, secure and allow retraction and extraction of the shade relative to the roof support structure;
   c. a plurality of rollers rotatably affixed to and along an interior side of the external longitudinal beams, wherein some of the rollers are positioned on the top portion of the side of the external longitudinal beams, and other of the rollers are positioned on the bottom portion of the side of the external longitudinal beams;
   d. a pair of side support posts hingedly or removably affixed to each of the external longitudinal beams; and
   e. a handle post having a pin secured at one end to facilitate retracting and extending the shade from the roof support structure, the pin being sized to be received within an aperture of the proximal end of the frame.

11. The retractable shade system of claim 10, wherein the plastic sheet is made from polycarbonate.

12. The retractable shade system of claim 10, wherein the side support posts are removably affixed to the external longitudinal beams, presenting with a pin at the proximal end of each side support post intended to be received within a corresponding aperture of each of the external longitudinal beams.

13. The retractable shade system of claim 12, further comprising braces presenting as a pair of plates, affixable to a back end of the trailer, the plates having aligned apertures, and spaced sufficiently apart to receive a distal end of one of the side support posts, the distal end of the side support posts also having an aperture therethrough, so that when the apertures of the plates and the distal end of the side support post are aligned, a pin may be positioned therethrough to secure the distal end of the side support post to the brace.

14. The retractable shade system of claim 10, wherein the aperture positioned on the frame is presented on a tab secured to and extending from the beam.

15. The retractable shade system of claim 10, wherein the frame comprises additional beams, at its distal end, to provide a counterweight to the shade when in its extended position.

16. The retractable shade system of claim 15, further comprising a cable secured to the internal longitudinal beam of the frame, wherein adjustment of the length of the cable prevents bowing of the shade.

17. The retractable shade system of claim 12, wherein the side support posts comprise multiple segments, in a telescoping arrangement.

18. The retractable shade system of claim 10, wherein the roof support structure further comprises a plurality of wheels securable to the trailer, positioned to align with the external and internal beams.

19. A retractable shade system coupled with a trailer, the system comprising:
   a. a shade including a frame and a polycarbonate plastic sheet, the frame having a plurality of longitudinal and latitudinal beams, including a pair of external longitudinal beams and a pair of external latitudinal beams, at least one internal longitudinal beams, and three or more latitudinal beams;
   b. a roof support structure comprising a pair of c-channel rails secured to the roof of the trailer, the rails sized to accommodate, secure and allow retraction and extraction of the shade relative to the roof support structure; and
   c. a plurality of rollers rotatably affixed to and along the external longitudinal beams, wherein the rollers are affixed to an internal side of the external longitudinal beams, and received within the c-channels of the roof support structure;
   d. a pair of side support posts removably affixed to each of the external longitudinal beams, wherein each side support post includes a pin at one end intended to be received within a corresponding aperture of one of the external longitudinal beams, and an aperture at the other end;
   e. two braces, each brace presenting as a pair of plates affixed to a back end of the trailer, the plates having aligned apertures, and spaced sufficiently apart to receive the aperture of one of the side support posts so that when the apertures of the plates and the side support post are aligned, a pin may be positioned therethrough to secure the end of the side support post to the brace; and
   f. a handle post having a pin secured at one end to facilitate retracting and extending the shade from the roof support structure, the pin being sized to be received within an aperture of the frame.

20. The retractable shade system of claim 19, wherein some of the rollers are affixed to the top of the side of the external longitudinal beams, and other of the rollers are affixed to the bottom of the side of the external longitudinal beams.

\* \* \* \* \*